United States Patent [19]

Stoltz et al.

[11] 3,842,512
[45] Oct. 22, 1974

[54] DEVICES FOR SENSING DEVIATIONS FROM A HORIZONTAL PLANE

[75] Inventors: Andries Johannes Stoltz; Nicolaas Johannes Cornelius Snyders; Elin Pickard, all of Pretoria, South Africa

[73] Assignee: Monres (Proprietary) Limited, Johannesburg, South Africa

[22] Filed: Feb. 27, 1973

[21] Appl. No.: 336,343

[30] Foreign Application Priority Data
Mar. 13, 1972 South Africa...................... 72/1697

[52] U.S. Cl..................................... 33/366, 33/378
[51] Int. Cl............................................... G01c 9/06
[58] Field of Search ............. 33/366, 367, 377, 378

[56] References Cited
UNITED STATES PATENTS

| | | | |
|---|---|---|---|
| 1,552,691 | 9/1925 | Cirvin .................................. | 33/378 |
| 3,559,294 | 2/1971 | Bauer................................... | 33/366 |
| 3,698,094 | 10/1972 | Stacey et al. ........................ | 33/366 |

Primary Examiner—Louis R. Prince
Assistant Examiner—Charles E. Phillips
Attorney, Agent, or Firm—Karl W. Flocks

[57] ABSTRACT

A device for sensing deviations from a horizontal plane is disclosed, which device includes a pair of spaced chambers interconnected by a tube which allows liquid to flow from one chamber to the other as the position of the device varies with respect to the horizontal plane. A metal float is provided in each chamber and above each float there is a sensor of the proximity type. Transistor oscillators, the outputs of which vary upon approach of a float, form suitable sensors. A metal rod runs through the tube and is pivotally mounted at the centre of the tube. The floats are secured one adjacent each end of the rod and the rod thus prevents both floats from lifting simultaneously. Electrical signals from the sensors, which signals indicate a deviation from the horizontal plane, are fed to drive means such as an electric motor which operates to tilt the device back to the horizontal position.

8 Claims, 3 Drawing Figures

PATENTED OCT 22 1974　　　　　　　　　　3,842,512
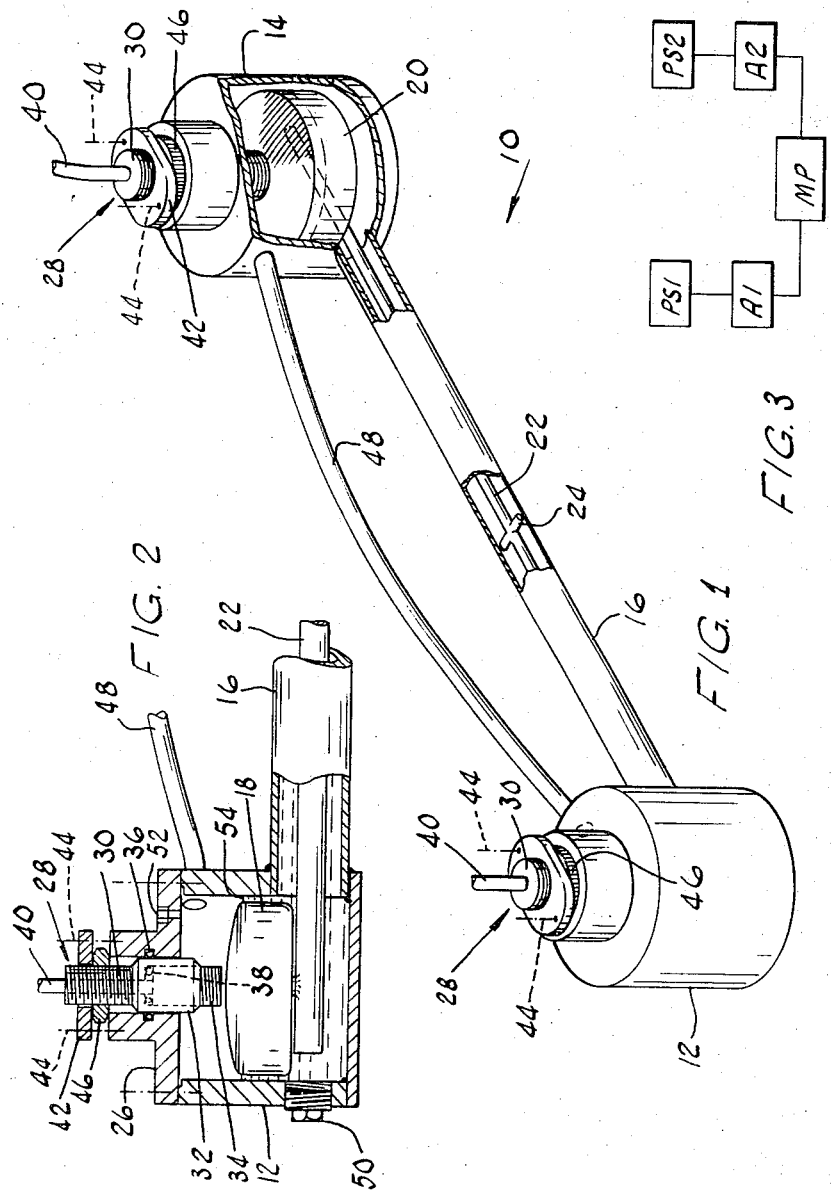

DEVICES FOR SENSING DEVIATIONS FROM A HORIZONTAL PLANE

THIS INVENTION relates to a device for sensing deviation from a horizontal plane.

BACKGROUND TO INVENTION

Many machines work most efficiently when they are properly orientated in vertical and horizontal planes. Indeed, for some machines, such as brick-laying machines, accurate alignment in the horizontal direction is essential if they are properly to carry out their desired function. In the case of a brick-laying machine, this function is to lay bricks in courses which are accurately horizontal.

The problem of providing a device which will sense deviation from a horizontal plane, and act rapidly to correct such deviation, is one which has received considerable attention. One solution which has been widely employed consists of the provision of a pendulum, there being cooperating sensors on the part of the machine which must be maintained horizontal. When the machine tilts, the pendulum, of course, remains vertical and hence the sensors approach the pendulum. The resulting signals are used to drive means which corrects the position of the part of the machine which must be maintained horizontal. This type of device, although widely used, has very considerable disadvantages. Firstly, the pendulum can be made to swing in an undesirable fashion when the machine is subjected to shocks. Additionally, pendulum devices "hunt" and it has been proposed to include dampers to eliminate this problem. However, in view of the low inertia of a pendulum, the dampers very often cause the pendulum to come to rest before the machine part is horizontal.

Level-sensing devices including floats have also been proposed. As a device of this type is tilted out of the horizontal plane, the resultant liquid flow lifts one of the floats with respect to the chamber in which it is contained. In one particular example, the rising float actuates a micro-switch and the signal from this is used to actuate the drive means.

Prior art devices of this type cannot operate to maintain a machine level with great accuracy. The most important problem encountered is that sensing devices of this type are, in use, subjected to a wide range of temperature variations. Reverting to the example of a bricklaying machine, this will work, early in the morning, in temperatures which may not be very much above freezing point (say 1°C or 34°F). By midday, the temperature may have risen to, say 10°C (50°F) and by late afternoon will have dropped once more. These temperature variations cause substantial changes in the volume occupied by the liquid which supports the floats. Consequently, the situation arises that, after a temperature increase, the volume of liquid has increased so substantially that the floats have been raised by an extent sufficient to actuate both micro-switches simultaneously. Obviously, the control system which is provided for returning the machine part to a horizontal plane is unable to act upon conflicting signals of this nature and, for satisfactory operation, the device must be re-calibrated at very short intervals.

The present invention provides a device for sensing deviation from a horizontal plane which device is specifically intended for use on a brick-laying machine, but which can be used on any machine having a surface or component which must extend horizontally. It will be understood that, by maintaining one part of a machine horizontal, the spacial position of all other parts of the machine which are fixed to that part can be controlled. For example, if it is desired to hold a column vertical, then the device can be mounted on a plate which projects at right angles to the column. As another example, a road grader includes a blade which, generally speaking, must be held at some specific angle to the horizontal (say 5°). If the deviation sensing device is horizontal when the blade is at the desired angle then, by sensing and correcting deviations of the device, the blade can be held at the desired angle.

BRIEF SUMMARY OF INVENTION

According to the present invention there is provided a device for sensing deviation from a horizontal plane which comprises a vessel partially filled with liquid, a structure comprising a first float, a second float, and a rod connecting the two floats, the connecting rod being pivotally mounted at a position between its connections to the floats thereby to prevent both floats rising simultaneously and the floats being buoyed-up by said liquid, and sensing means for detecting the position of said structure with respect to said vessel and for producing electrical output signals in dependence on the detected position of said structure.

The sensing means can be arranged in a number of ways. Thus, in one form, the sensing means is associated with, and detects movement of, one of said floats, and produces an output signal each time that said float moves, with respect to said sensing means, by a predetermined amount from the position it occupies when the device is horizontal. Alternatively, a sensing means can be associated with each float to detect movement thereof, one or other of the sensing means producing an output signal each time that the floats move, with respect to the sensing means, by a predetermined amount from the positions they occupy when the device is horizontal. In this latter form, each sensing means can produce an output signal upon the associated float rising, with respect to the sensing means, by said predetermined amount.

Preferably, said rod is submerged in said liquid.

In one specific constructional form, the device includes a pair of spaced chambers, one of said floats being in each chamber and there being a tube interconnecting the lower parts of the chambers to permit flow of liquid from one chamber to the other. In this form, the rod can pass through said tube and be pivotally connected to the tube.

DETAILED DESCRIPTION.

For a better understanding of the present invention, and to show how the same may be carried into effect, reference will now be made, by way of example, to the accompanying drawing in which:

FIG. 1 is a diagrammatic pictorial view, partly in section, of a device for sensing deviation from a horizontal plane;

FIG. 2 is a section through one of the chambers of the device of FIG. 1; and

FIG. 3 is block diagram.

Referring firstly to FIG. 1, the deviation sensing device is generally indicated at 10 and comprises first and second chambers 12 and 14 which are interconnected by, and welded to, a hollow tube 16. The chambers and tube together form a vessel which is partially filled with liquid. Diesel fuel has been found to be suitable as the filling liquid for its viscosity is of the desired value and its co-efficient of expansion is small. It is also inexpensive and readily available.

A metal float 18 is provided in the chamber 12 and a metal float 20 is provided in the chamber 14. A solid rod 22 is connected adjacent its ends to the floats 18 and 20 and runs through the tube 16. A cross shaft 24 pivotally mounts the rod 22 at the centre of the tube 16. Thus the rod is mounted at a position between its connections to the floats and the floats are consequently prevented from rising simultaneously.

In one constructional form of mounting for the shaft 24, a square collar (not shown) surrounds the centre part of the tube 16 and opposed apertures in the wall of the tube 16 receive bearings (not shown) for the shaft 24. The shaft 24 passes through the rod 22 and is secured thereto by a grub screw (not shown). The shaft 24 is stepped to provide an increased diameter portion between the rod 22 and each bearing. The bearings are thus located by the square collar and by the shoulders of the stepped shaft.

The rod 22 has a substantial throttling effect on liquid flow through the tube 16 and thus reduces the flow rate considerably.

As shown in FIG. 2, the upper end of the chamber 12 is closed by a bolted-on cap 26 having a central bore which receives a holder 28. The holder 28 has an externally threaded shank 30 which is integral with an internally threaded tube 32. A sensing means in the form of a proximity sensor 34 is screwed into the tube 32. O-ring seals 36 and 38 seal between the holder and the wall of the bore in the cap 26 and between the end of the tube 32 and the sensor 34.

A cable 40 passes through the shank 30 to the sensor 34. The sensor itself projects downwardly into the chamber so that it is in co-operating relationship with the float 18.

The upper end of the shank 30 passes, with clearance, through a clamping plate 42 which is releasably secured by bolts (only the centre lines 44 of which are shown) to the cap 26. A knurled adjusting nut 46 is screwed onto the shank 30. By loosening the bolts 44, the nut 46 is released and can be turned with respect to the shank 30 thereby to move the holder, and hence the sensor 34, towards or away from the float 18.

The upper end of the chamber 14 is constructed in identical manner.

An air tube 48 connects the upper part of the chamber 12 to the upper part of the chamber 14. The illustrated form of the tube 48 ensures that, if any liquid enters the tube from either chamber upon the device being tilted by an extreme amount, the liquid will, upon levelling, run back to the chambers.

A plug 50 closes the aperture in the wall of the chamber 12 through which the rod 22 is inserted during assembly. A plugged filler opening 52 (FIG. 2) is also shown.

When the tube 16 is horizontal, then the chambers 12 and 14 are liquid filled to the level 54 (FIG. 2) so that the floats are partially immersed. The tube 16 is completely liquid filled so that the rod 22 is completely immersed. The liquid exerts a considerable damping effect on the structure composed of the rod and the floats.

In FIG. 3, the proximity sensors are designated PS1 and PS2 and are shown connected to amplifiers A1 and A2 which are in turn connected to drive means in the form of a motor or pump designated MP.

In use of the device, it can be mounted directly on the part of the machine which is to be maintained horizontal. Alternatively, the device can be mounted on what can be termed a "control part." The control part is accurately horizontal when the part of the machine which it is desired to maintain in a certain spacial position, is in the desired position. A plate secured at right angles to a column to enable the column to be held vertical is an example of a "control part."

When the part of the machine to which the device is fitted tilts, so that one chamber rises and the other falls, liquid flows from one chamber to the other. It should be noted that, for stability, the floats are arranged in a largely submerged condition. By way of example, some 90 percent of the volume of each float can be below the liquid surface. Additionally, each float is a close fit in its chamber thereby to reduce the free space between its periphery and the chamber wall and in which space liquid can rise. Liquid flow between the chambers results in one float moving away from the associated sensor and the other float moving in the opposite direction until it comes within the sensing range of the associated sensor 34. The output signal produced by the sensor is fed to one of the amplifiers and thence to the drive means MP. This device can be a reversible electric motor which drives, for example, screws to turn said part of the machine about an axis to return it to its horizontal condition. Alternatively the drive means can be an hydraulic pump operative to feed fluid to and from hydraulic cylinders which have the same function as the screws. The tube 48 balances the air pressures and ensures that no sub- or above atmospheric air pressures are created in the upper parts of the chambers.

Suitable proximity sensors are manufactured by Turck Elektronic-Feinbau under the designation "NIG 5." This particular type of sensor has a transistor oscillator which is detuned by the proximity of the metal float, or by approach of a metal part of the float if it is not entirely of metal. The resulting change in the internal resistance of the sensor serves to actuate the amplifier to which it is connected. Thus, in FIG. 3, the signals from the two sensors, referenced PS1 and PS2, are fed to the amplifiers A1 and A2, and the outputs of the amplifiers are fed to the drive means MP. If the machine part being levelled is of great weight and size, such as in agricultural and civil engineering machinery, then the outputs of the amplifiers A1 and A2 can merely be used to close switches which connect the drive means MP to an appropriately large source of power.

In the illustrated embodiment, each sensor 34 detects that the gap between itself and the associated float has been reduced to a certain dimension. By way of example, in one embodiment the gap between each float and sensor can, when the device is horizontal, be eighty-thousands of an inch. In this embodiment, a lift of 5-thousands causes the sensor's output signal to change sufficiently to result in a deviation correction. There are a large number of ways in which the sensors can be arranged and, as dealt with below, there are a large number of different sensors that can be used. As regards the arrangement of the sensors, they can be positioned to detect downward movement of the floats with respect thereto (instead of upward movement as illustrated). In another arrangement the sensors can be adjacent the float side walls and can detect movement of the side walls of the floats passed the sensors. Alternatively, two sensors can be associated with one float to detect movement of the float both upwards and downwards relatively thereto.

It will be understood that each sensor 28 produces a continuous output signal, and that it is the change in nature of one of the signals which results in the correcting sequence being initiated. However, the sensors could be such that the signals produced are of the on-off type. For example, a continuous signal could be produced until one of the floats moved to within the sensing range of the sensor whereupon the signal ceased, or there could be no signal until the float was within sensing range.

The following details of a practical embodiment are given by way of example. In this embodiment, the tube 22 is 76cm long and has an inside diameter of 27 mm. The rod 16 is 19 mm outside diameter. Each float is 100 mm diameter and the internal diameter of each chamber 103 mm. It will be understood that, in the drawings, the annular gap between the rod 22 and tube 16 is greatly exaggerated.

We claim:

1. A device for sensing deviation from a horizontal plane which comprises
   a pair of spaced chambers each partially filled with a liquid;
   a tube interconnecting the lower parts of the chambers to permit flow of liquid between the chambers;
   a structure comprising a first float, a second float, and a rod connecting the two floats, there being a float in each chamber and said rod passing through the tube and being pivotally connected thereto thereby to prevent both floats rising simultaneously; and
   sensing means for detecting the position of said structure with respect to said chambers and tube and for producing electrical output signals in dependence on the detected position of said structure.

2. A device for sensing deviation from a horizontal plane which comprises a pair of spaced chambers each partially filled with liquid, a tube interconnecting the lower parts of the chambers to permit flow of liquid between the chambers, a structure comprising a first float, a second float and a rod connecting the two floats, there being a float in each chamber and each float being partially immersed in the liquid, the connecting rod passing through the tube, being completely immersed in the liquid and being pivotally connected to the tube at a position between its connections to the floats thereby to prevent both floats rising simultaneously, and sensing means for detecting the position of said structure with respect to said chambers and tube and for producing output signals in dependence on the detected position of said structure.

3. A device according to claim 2 in which a sensing means is associated with each float to detect movement thereof, one or other of the sensing means producing an output signal each time that the floats move, with respect to the sensing means, by a predetermined amount from the positions they occupy when the device is horizontal.

4. A device according to claim 3 in which each sensing means produces an output signal upon the associated float rising, with respect to the sensing means, by said predetermined amount.

5. A device according to claim 3 in which each sensing means is a proximity sensor.

6. A device according to claim 5 in which each proximity sensor includes a transistor oscillator, and each float includes a metal portion for influencing the frequency of oscillation of the oscillator upon the metal portion approaching the sensor.

7. A device according to claim 2 and including an air tube interconnecting the upper ends of said chambers.

8. A device according to claim 2 in which each float is a close fit in its associated chamber thereby to reduce to a minimum the free space between its periphery and the chamber wall.

* * * * *